April 29, 1969 G. RAMON 3,441,306
HOOK ATTACHMENT FOR SHOVELS
Filed Feb. 1, 1968

INVENTOR
GINO RAMON
BY Gerald P. Welch
ATTORNEY

United States Patent Office 3,441,306
Patented Apr. 29, 1969

3,441,306
HOOK ATTACHMENT FOR SHOVELS
Gino Ramon, 7123 W. Blue Mound Road,
Wauwatosa, Wis. 53213
Continuation-in-part of application Ser. No. 662,530,
Aug. 22, 1967. This application Feb. 1, 1968, Ser.
No. 702,339
Int. Cl. A01b 1/02
U.S. Cl. 294—59                1 Claim

ABSTRACT OF THE DISCLOSURE

An attachment for a shovel for cement or concrete workers comprising a hook or claw integral with a plate to be attached to the under surface of a shovel, about two inches from the blade edge, said hook being backwardly directed to enable a worker to pull reinforcement mesh toward himself to raise and tighten the same during the operation of shoveling and laying cement or concrete.

---

This application is a continuation in part of my prior application bearing the Ser. No. 662,530, filed on Aug. 22, 1967, Group 313.

Figure 1:
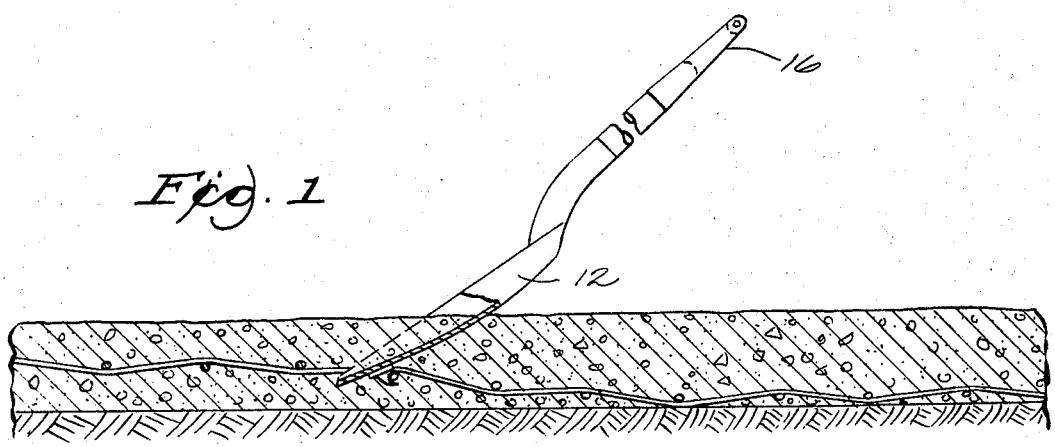
FIG. 1 is a side view partly in elevation and partly in section of a shovel provided with a hook or claw embodying the invention shown engaged in a portion of metal wire mesh reinforcement material to raise and position the same in the moist concrete.
Figure 2:
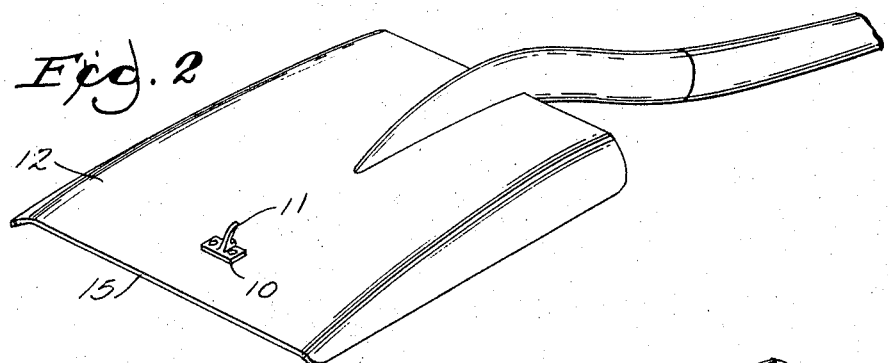
FIG. 2 is a bottom view in perspective of a shovel equipped with the plate and integral hook.
Figure 5:
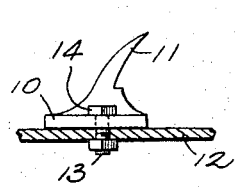

Referring more particularly to the drawing, the numeral 10 refers to a rectangular plate of relatively small area with the integral hook or claw 11. Releasable fastening means in the form of bolts 13 and securing nuts 14 are employed to subjoin said plate 10 on the lower surface of shovel 12 approximately two inches from the blade edge 15 of said shovel so disposed that the hook or claw 11 has the point thereof directed backwardly toward the shovel handle 16.

In concrete floor construction, the use of metal wire mesh as reinforcement means is common, and the present shovel with its attachment is used for placing and distributing the flowing concrete over the said reinforcing means, and during this operation the hook or claw 11 is employed to lift the mesh and to pull it taut toward the operator as he works. When this particular operation is finished, the plate 10 and the integral hook 11 may be quickly and easily removed to enable use of the shovel 12 in the ordinary manner. When equipped with the attachment 10, the shovel 12 saves the use of an extra tool.

Figure 3:
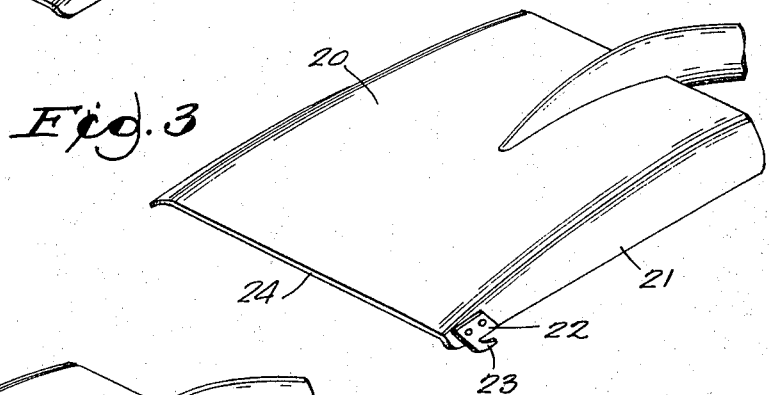
FIG. 3 shows a view in perspective of a modified form of the invention attached to a side edge of a shovel.

In FIG. 3 a modified form of the invention is shown, in which a shovel 20 has fixed to one side edge thereof, 21, a plate 22 with integral rearwardly directed hook 23, adjacent the frontal edge 24 of the shovel.

Figure 4:
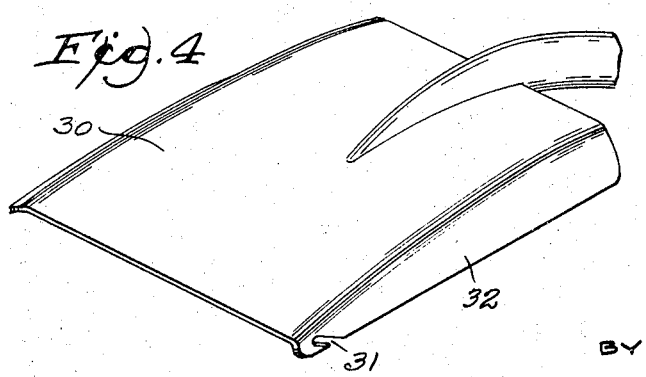
FIG. 4 is a view in perspective of another modification of the invention.

FIG. 4 illustrates a further modification, in which a shovel 30 has an oblique slot at 31 in one side edge 32 thereof. It will be understood that the modified forms of FIGS. 3 and 4 may be utilized in the same manner to lift and pull the metal wire mesh in the soft concrete.

It will be understood that the device is capable of many modifications in structure and design, without departing from the spirit of the invention.

Having thus described the invention, what is claimed and desired to be secured by Letters Patent of the United States, is:

1. In combination with a shovel, a plate member for attachment to one side of the shovel, and a hook integral with and on a plane with said plate so formed as to protrude beyond the side portion of the shovel rearwardly toward the handle of said shovel to enable the user to pull toward him or raise metal wire reinforcement mesh used during concrete installation operations.

References Cited

UNITED STATES PATENTS 3,325,835   6/1967   Burns _____ 294—59

EDWARD A. SROKA, *Primary Examiner.*

H. C. HORNSBY, *Assistant Examiner.*